(12) United States Patent
Kitoh

(10) Patent No.: US 6,753,104 B2
(45) Date of Patent: *Jun. 22, 2004

(54) LITHIUM SECONDARY BATTERY

(75) Inventor: Kenshin Kitoh, Nagoya (JP)

(73) Assignee: NGK Insulators, Ltd., Nagoya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,628

(22) Filed: Jun. 1, 1999

(65) Prior Publication Data

US 2002/0015892 A1 Feb. 7, 2002

(30) Foreign Application Priority Data

Jun. 2, 1998 (JP) ............................................ 10-153256

(51) Int. Cl.[7] .............................................. H01M 10/40
(52) U.S. Cl. ........................................... 429/7; 429/211
(58) Field of Search ............................ 429/7, 211, 233, 429/245

(56) References Cited

U.S. PATENT DOCUMENTS

| 378,078 | A | * | 2/1888 | Barnes |
| 597,969 | A | * | 1/1898 | Ferguson |
| 3,080,463 | A | * | 3/1963 | Kozacka |
| 3,213,242 | A | * | 10/1965 | Cameron |
| 5,849,431 | A | * | 12/1998 | Kita et al. |
| 6,071,638 | A | | 6/2000 | Fradin |
| 6,099,986 | A | * | 8/2000 | Gauthier et al. |
| 6,106,975 | A | * | 8/2000 | Watanabe et al. |

FOREIGN PATENT DOCUMENTS

| JP | 8-185850 A | * | 12/1996 |
| JP | 10-083833 | | 3/1998 |
| JP | 10-172534 | | 6/1998 |
| JP | 10-214614 A | * | 8/1998 |

OTHER PUBLICATIONS

PTO 03–383 Translation of Japanese Patent Application No. 8–185850.*

Physics for Scientics and Engineers, Fishbane et al., 1993, p. 811.*

CRC Handbook of Chemistry and Physics, 59th ed., 1978, pp. B–91, B–115 and B–141.*

English translation of JP 10–172534.*

* cited by examiner

Primary Examiner—W. L. Walker
Assistant Examiner—David L. Sorkin
(74) Attorney, Agent, or Firm—Burr & Brown

(57) ABSTRACT

A lithium secondary battery includes an internal electrode body including a positive electrode, a negative electrode, and a separator. The positive electrode and the negative electrode are wound or laminated via the separator so that the positive electrode and the negative electrode are not brought into direct contact with each other. At least a plurality of tabs for current collecting were provided to have a total cross-sectional area of the tabs be not less than a constant area in accordance with the quality of the material to be used for the tabs so that the tabs to be connected to each of the positive and negative electrodes may not respectively fuse when at least 100 A current has flown through the lithium secondary battery. The lithium secondary battery maintains a good charge-discharge cycle characteristics, and safety may be secured with electricity being cut off when an excess current has occurred due to external short circuit, etc., so that the battery may not be exploded nor be ignited. In particular, the lithium secondary battery may be preferably used for driving a motor of an electric vehicle, etc.

12 Claims, 3 Drawing Sheets

FIG. 4
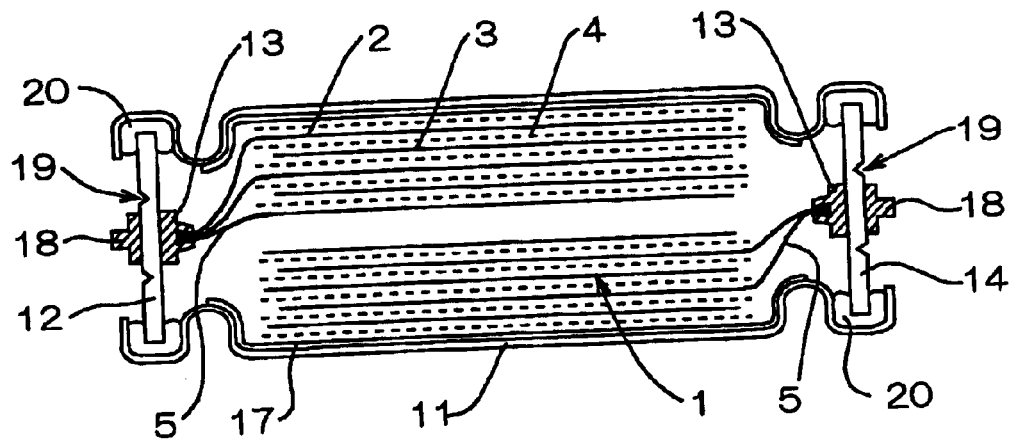
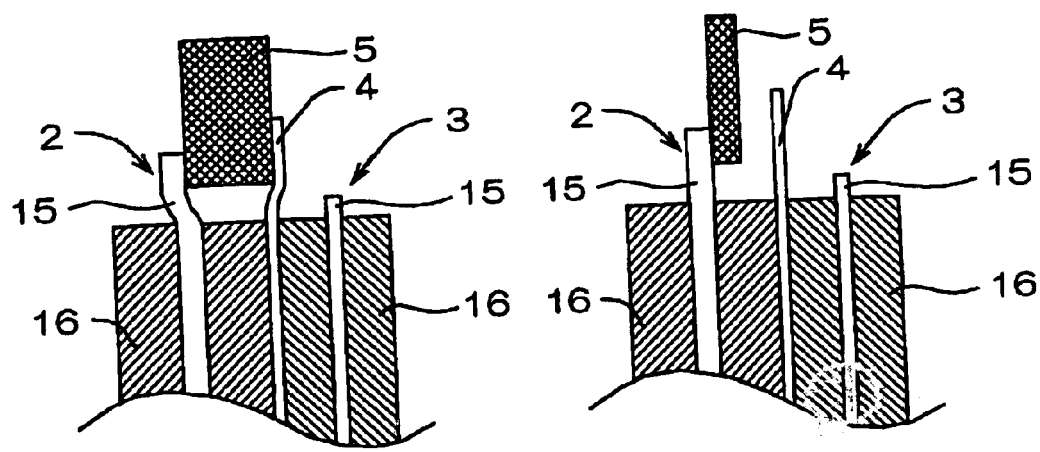
FIG. 5 (a)   FIG. 5 (b)
FIG. 6
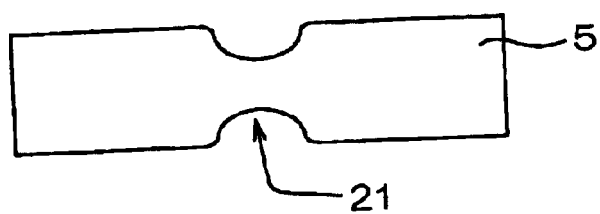

LITHIUM SECONDARY BATTERY

BACKGROUND OF THE INVENTION AND RELATED ART STATEMENT

The present invention relates to a lithium secondary battery which maintains a good charge-discharge cycle and in which safety may be secured with electricity being cut off when an excess current has occurred due to external short circuit, etc. so that the battery may not be exploded nor be ignited, and in particular, to a lithium secondary battery which may be preferably used for driving a motor of an electric vehicle, etc.

In recent years, in midst that it is eagerly desired to regulate the emission of exhaust gas including carbon dioxide and other harmful substances with the elevation of the environment protection campaign as a background, the campaign to promote an introduction of an electric vehicle (EV) and a hybrid electric vehicle (HEV) has become active in replacement of automobiles using fossil fuels such as a vehicle driven by gasoline in the automobile industry. A lithium secondary battery as a motor-driving battery acting as a key for putting such EV as well as HEV into practical use, is required to have not only huge battery capacity but also a huge battery output much affecting acceleration performance as well as gradeability of a vehicle, and on the other hand, however, a strict safe standard has been established from the point of view of securing safety since the battery is provided with high energy density.

In general, the internal electrode body of a lithium secondary battery comprises a positive electrode, a negative electrode and a separator made of porous polymer film, the positive electrode and the negative electrode being wound or laminated via the separator so that the positive electrode and negative electrode are not brought into direct contact with each other. For example, as shown in FIG. 1, an internal electrode body 1 of winding type is formed by winding a positive electrode 2 and a negative electrode 3, having a separator 4 in between, and tabs 5 are provided for each of positive and negative electrodes 2, 3 (hereafter referred to "electrodes 2, 3") respectively. And, the ends opposite to the ends connected with electrodes 2, 3 of each tab 5 are attached to an external terminal (not shown) or an electric current extracting terminal (not shown) being conductive to the external terminal. That is, the tab 5 serves to act as a lead line (a current path) being conductive to the external terminal, etc. together with conducting current collecting from electrodes 2, 3.

Here, a plan view of the electrodes 2, 3 when the internal electrode body 1 is spread out is shown in FIG. 2. The electrodes 2, 3 are formed with an electrode active material being coated respectively onto metal foils 15 made of aluminum, etc. for the positive electrode 2 and made of copper for the negative electrode 3 respectively as current collecting bodies, thus forming an electrode active material layer 16.

The tab 5 is provided on one side of such a metal foil 15, and those having thin band shape are preferably used so that the portion where the tab 5 of the electrodes 2, 3 are attached may not swell to the direction of a periphery when the internal electrode body 1 was formed. In addition, they are preferably disposed in approximately uniform distance so that one tab 5 conducts current collecting from a constant area in the electrodes 2, 3. Incidentally, in general, a material to be used for the tab 5 is the same as a material of the metal foil 15 to which the tab 5 is attached.

Incidentally, with respect to a lithium secondary battery for an EV or an HEV, it is necessary to use lithium secondary batteries with a voltage of around 4 V at the highest for a single battery, such single batteries in plurality being connected in series, since a constant voltage is required to drive a motor, and, however, there is a case where discharge of a large current not less than 100 A is required to obtain the herein desired acceleration performance or gradeability. For example, maintaining that 200 V with 100 A be required and 3.6 V be an average terminal voltage at the time of discharge thereof, 56 units of single batteries are required to be connected in series, resulting in 100 A current flowing at each single battery at this time.

The internal configuration of a battery must be designed so that also in the case where such a huge current flows, the battery may normally operate while the output loss is suppressed as low as possible. Therefore, paying attention to the current path from the above described internal electrode body 1 and the external terminal, it is deemed preferable that the resistance of members themselves of the electrodes 2, 3 as well as the metal foils 15, or the tabs 5 and the external terminals, etc. all configuring the electrodes 2, 3 is small.

However, judging from the point of view of securing battery capacity as well as securing mechanical strength of electrodes, few degrees of freedom in setting quantity of the electrode active material layer 16 configuring the electrodes 2, 3 and sizes of the metal foils 15 are permitted while as concerns the electric current extracting terminal 13, normally considering the shape of batteries, or the energy density thereof, the quantity of the maximum discharge current, light-weight low-resistance members with resistance values not more than a predetermined value within a range which is possible to set are used.

On the other hand, the tab 5 has an allowable range to set up a resistance value on a point of view of feasibility to set up its shape freely as far as the shape of the tab 5 is to be housed in the space between the battery case housing the internal electrode body 1 therein and the internal electrode body 1. Metal members are used for the tab 5, whose resistance value is generally made smaller, nevertheless, the rate of the resistance value of the tab occupying the total internal resistance of a lithium secondary battery is not necessarily small, and cannot be ignored.

On condition that a plurality of above described tabs 5 in the shape of foil band are used, a tab 5 adopting a larger cross-sectional area to make the resistance value smaller will result in introducing a situation where energy density of a battery gets decreased since the total weight of the tabs 5 will become heavier in spite that effective decrease in the internal resistance and effective decrease in the output loss is expected.

On the contrary, making the cross-sectional area of the tabs 5 smaller decreases the total weight of the tabs 5 and increases the battery's energy density, but on the other hand there will occur such problems that the resistance value of the tabs 5 increases, the tabs 5 the fuse due to increase in output loss because of increase of internal resistance or heat generated by current, and thus functioning as a battery will disappear. Accordingly, from the standpoint to avoid such problems and to do well both in reducing output loss and in increasing energy density, cross-sectional area of not less than a certain value is required for the tabs 5.

On the other hand, with respect to the above described problems, it is feared that an accident involving an explosion or an ignition may occur when a great current has been discharged at a time due to an external short circuit, etc.

since a lithium secondary battery has higher energy density, and for the purpose of avoiding such situation in advance, "Guideline for safety evaluation on secondary lithium cells (hereafter referred to SBA Guidelines)" published by Battery Association of Japan regulates that a lithium secondary battery should be free of burst or ignition to be evidenced by an external short circuit test. To fulfill such a standard, in a lithium secondary battery various safety devices such as a current-limiting mechanism comprising a PTC element, a release mechanism of battery's internal pressure involving safety valves, and pressure joints, etc. are incorporated or proposed.

Here, a current fuse is utilized in various electric appliances, but has never been used up to date as a current cutoff mechanism to be disposed inside a lithium secondary battery since a size or a shape of the current fuse is subject to a limit. However, if the tab 5 can function as the current fuse, with which an existing safety device may be replaced or concurrently disposed, it is deemed that a safety increase may be planned.

In the case where the tab 5 is used as a current fuse like this, the current cutoff value must be determined so that the tab 5 is fused with a predetermined quantity of excess current, but as mentioned above, there is naturally a limit in the structural shape of the tab 5. That is, for the purpose of using the tab 5 as a current fuse, the cross-sectional area of the tab 5 must be set not more than a predetermined value, but at the same time, considering the fact that the quantity of excess current may also defer due to the quantity of single battery's internal resistance, it is regarded as necessary to set the cross-sectional area of the tab 5 in accordance with the quantity of a single battery's internal resistance.

SUMMARY OF THE INVENTION

The present invention was attained by contemplating the problems of the prior art mentioned above, and its first purpose is to provide a lithium secondary battery having realized reduction in output loss and increase in energy density, and its second purpose is to provide a lithium secondary battery which has been planned to secure and increase in safety by incorporating tabs into the battery as a current fuse, being a replacement for a conventional safety device or to be concurrently disposed, and furthermore its third purpose is to provide a lithium secondary battery which concurrently realizes these characteristics, that is, reduction in output loss and increase in energy density, and security of safety having given tabs a function as a current fuse.

That is, according to the present invention, there is provided a lithium secondary battery, comprising:

an internal electrode body including a positive electrode, a negative electrode, and a separator, the positive electrode and the negative electrode being wound or laminated via the separator so that the positive electrode and the negative electrode are not brought into direct contact with each other;

an organic electrolyte; and at least a plurality of tabs to be connected to each of the positive and negative electrodes for current collecting, the tabs having a total cross-sectional area of the tabs not less than a constant area in accordance with the quality of the material to be used for the tabs so that the tabs to be connected to each of the positive and negative electrodes may not fuse when at least 100 A current flows through the lithium secondary battery.

In such a lithium secondary battery of the present invention, the relationship between material of the tab and total cross-sectional area of the tabs is preferably not less than $0.009$ $cm^2$ for aluminum, not less than $0.005$ $cm^2$ for copper, and not less than $0.004$ $cm^2$ for nickel, further preferably not less than $0.014$ $cm^2$ for aluminum, not less than $0.008$ $cm^2$ for copper, and not less than $0.008$ $cm^2$ for nickel. A thickness of the tab is preferably not more than twice the thickness of an electrode active material layer in an electrode to which the tab is welded, and further preferably not more than the thickness of an electrode active material layer, that is, it is preferred that the thickness is set within a range where the portions where the tabs have been attached shall not swell when the tabs are attached to electrodes to be wound or laminated. Incidentally, from the point of view of reduction in internal resistance, a sum of resistance value of the tabs per a unit battery is preferably not more than 1 mΩ.

In addition, according to the present invention, there is further provided a lithium secondary battery, comprising:

an internal electrode body including a positive electrode, a negative electrode, and a separator, the positive electrode and the negative electrode being wound or laminated via a separator so that the positive electrode and the negative electrode are not brought into direct contact with each other;

an organic electrolyte; and at least a plurality of tabs to be connected to each of the positive and negative electrodes for current collecting, wherein the tabs function as current fuses.

In such a lithium secondary battery, the relationship between material of the tabs and the total cross-sectional area of the tubs when internal resistance of a unit battery is set R (mΩ) is preferably not more than $0.36/R$ ($cm^2$) for aluminum, not more than $0.18/R$ ($cm^2$) for copper, and not more than $0.14/R$ ($cm^2$) for nickel, and more preferably not more than $0.18/R$ ($cm^2$) for aluminum, not more than $0.09/R$ ($cm^2$) for copper, and not more than $0.07/R$ ($cm^2$) for nickel. In addition, if the tab is provided with a narrow portion, the tab is easily made to function as a current fuse, which is preferable.

It is preferable that the internal resistance in the above described lithium secondary battery of the present invention is not more than 10 mΩ per a unit battery. In addition, by setting the relationship between material of the tab and total cross-sectional area of the tabs at not less than $0.008$ $cm^2$ and not more than $0.36/R$ $cm^2$ for aluminum, not less than $0.005$ $cm^2$ and not more than $0.18/R$ $cm^2$ for copper, and not less than $0.004$ $cm^2$ and not more than $0.14/R$ $cm^2$ for nickel, and further preferably at not less than $0.014$ $cm^2$ and not more than $0.18/R$ $cm^2$ for aluminum, not less than $0.008$ $cm^2$ and not more than $0.09/R$ $cm^2$ for copper, and not less than $0.008$ $cm^2$ and not more than $0.07/R$ $cm^2$ for nickel, a battery having the characteristics of the above described two kinds of lithium secondary batteries can be obtained.

Incidentally, when deviation of respective resistance values of tabs remains within ±20% of an average value, fusing at one tab causes increase in current flowing through the other tabs without making a large current flow into one tab with priority since difference in quantity of current related to the tabs is small, thus fusing of the tabs can be controlled not to occur in a chained fashion. It goes without saying that lack of variance in shape of respective tabs is preferred for the purpose that such deviation of resistance values of tabs is made smaller, and moreover, when an end part of tabs opposite to the end connected with electrodes is connected by pressure attachment, welding or eyelet, deviation of resistance for each tab having been connected with a battery can be reduced and preferable.

The characteristics of the above described lithium secondary battery of the present invention are preferably adopted as a lithium secondary battery with battery capacity of not less than 5 Ah, and the lithium secondary battery of the present invention is preferably used for an electric vehicle (EV) or for a hybrid electric vehicle (HEV).

BRIEF DESCRIPTION OF THE DRAWINGS

FIG. 4 is a cross-sectional view showing one embodiment according to the lithium secondary battery using a wound-type internal electrode body.

FIGS. 5(a) and 5(b) are enlarged sectional views of the attachment part of tabs into electrodes plate.

FIG. 6 is a plan view showing one embodiment of a shape of a tab preferably usable in a lithium secondary battery of the present invention.

DETAILED DESCRIPTION OF PREFERRED EMBODIMENT

Figure 1:
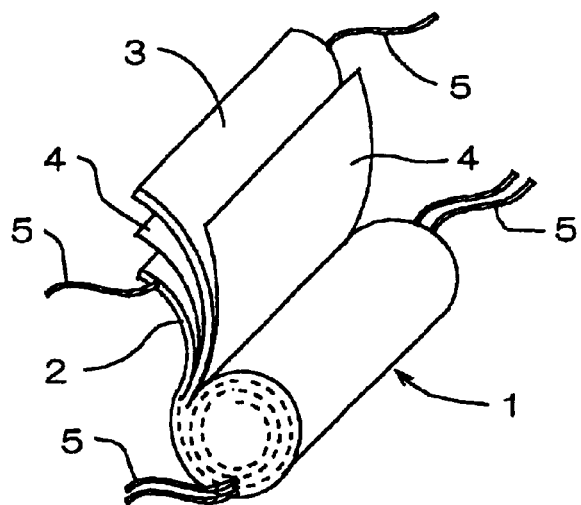
FIG. 1 is a perspective view showing the structure of a wound-type internal electrode body.

An internal electrode body of a lithium secondary battery of the present invention (hereinafter referred to as "battery") comprises a positive electrode, a negative electrode and a separator made of porous polymer film, the positive electrode and the negative electrode being wound or laminated for configuration so that the positive electrode and negative electrode are not brought into direct contact with each other via the separator. In particular, as earlier shown in FIG. 1, a wound-type internal electrode body 1 is formed by winding a positive electrode 2 and a negative electrode 3 via a separator 4, and tabs 5 are provided for the electrodes 2, 3. Incidentally, these tabs 5 can be attached to the electrodes 2, 3 with means such as supersonic welding, etc. at the time when the electrodes 2, 3 are wound together with the separator 4.

Figure 3:
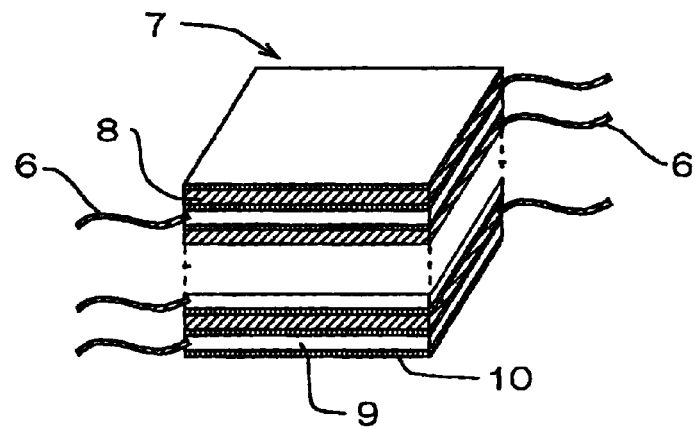
FIG. 3 is a perspective view showing one embodiment of the structure of a lamination-type internal electrode body.

On the other hand, as shown in FIG. 3, the lamination-type internal electrode body 7 laminates the positive electrode 8 and the negative electrode 9 alternately via the separator 10 with tabs 6 being connected to each of positive and negative electrodes 8 and 9 (hereinafter referred to "electrodes 8, 9") respectively. Such internal electrode bodies 1, 7 are basically configured to have a plurality of element batteries being connected in parallel, the element battery comprising positive electrodes 2, 8 and negative electrodes 3, 9 facing each other.

The positive electrodes 2, 8 and the negative electrodes 3, 9 are all produced by forming an electrode active material layer with electrode active materials being coated respectively onto metal foils as the current collecting body. Here, aluminum foils are preferably used as the current collecting body for positive electrodes 2, 8 and copper foils as the current collecting body for negative electrodes 3, 9 respectively, but titanium foils may be used as the current collecting body for positive electrodes 2, 8 and nickel foils as the electrode collecting body for negative electrodes 3, 9.

For a battery with any of above described configurations, lithium transition metal compound oxides such as lithium cobalt oxide ($LiCoO_2$), lithium nickel oxide($LiNiO_2$), lithium manganese oxide ($LiMn_2O_4$), etc. are generally used as positive active materials. Incidentally, in order to improve the conductivity of these positive active materials, it is preferable to mix with an electrode active material a carbon powder such as acetylene black, graphite powder, etc. On the other hand, for the negative active materials, an amorphous carbon material such as soft carbon or hard carbon, or carbon powder such as artificial graphite and natural graphite, etc. is used. These electrode active materials are transformed into a slurry, coated onto the current collecting body and stuck, thus the electrodes 2, 3, 8, 9 are produced.

As the separators 4, 10, it is preferable to use one having a three-layer structure in which a polyethylene film having lithium ion permeability and including micropores is sandwiched between porous polypropylene films having lithium ion permeability. This serves also as a safety mechanism in which when the temperature of internal electrode bodies 1, 7 is raised, the polyethylene film is softened at about 130° C. so that the micropores are collapsed to suppress the movement of lithium ions, that is, the battery reaction. And, since this polyethylene film is sandwiched between the polypropylene films having a softening temperature higher than the said polyethylene film, it becomes possible to prevent the direct contact between the electrodes (2, 3), (8, 9).

Below, the present invention will be explained by using the case of a wound-type internal electrode body 1 as an example. FIG. 4 is a cross-sectional view showing one embodiment of the battery structure. The internal electrode body 1 has been inserted in a battery case 11 with the tab 5 of the positive electrode 2 having been connected to a rivet 13 attached on a positive terminal plate 12, and the tab 5 of the negative electrode 3 having been connected to a rivet 13 attached on a negative terminal plate 14 respectively by pressure attachment.

Electrolyte has been injected inside the battery case 11, and as the electrolyte a carbonic acid ester family member such as ethylene carbonate (EC), diethyl carbonate (DEC), and dimethyl carbonate (DMC), and a nonaqueous organic electrolyte in which one or more kinds of lithium fluoride complex compound such as $LIPF_6$, and $IBF_4$, etc. or lithium halide such as $LiClO_4$ as an electrolyte are dissolved in a single solvent or mixed solvent of organic solvents such as propylene carbonate (PC), γ-butyrolactone, tetrahydrofuran, and acetonitrile, etc., are preferably used. Such electrolyte can be injected from an open end after the other end of the battery case is sealed, and thereafter, the open end is blockaded, thus the injection can be conducted.

Incidentally, since metal material is generally used as the battery case 11, it is preferable that an insulating sheet 17 has been disposed on the internal wall of the battery case 11 so as to secure insulation for the internal electrode body 1 and the battery case 11. But the function of this insulating sheet 17 may be replaced by the separator 4.

In addition, in a battery shown in FIG. 4, when metal material is used for the positive terminal plate 12 as well as the negative terminal plate 14, it is necessary to provide insulation between the battery case 11 and these positive terminal plate 12 as well as the negative terminal plate 14, and thus for the purpose of completing the battery seal, sealing member 20 has been disposed. Moreover, outside the positive terminal plate 12 as well as the negative terminal plate 13, external terminals 18 have been respectively provided and V-shape grooves 19 have been formed so that the V-shape grooves 19 function as safety valves (pressure release valves) when the battery's internal pressure increases.

Within the range of normal working current of such a battery, each of the tabs 5 must carry out its function as a current path without fusing. As for batteries for EV and HEV, it does not rarely occur that a huge current such as 100 A flows as a normally required current. Accordingly, in the present invention, the total cross-sectional area of the tabs 5 is supposed to have not less than a constant area in accordance with the quality of the material to be used for the tab 5 so that at least a plurality of tabs 5 for current collecting to be connected to the electrodes 2, 3 should not respectively fuse also when such a huge current has flown. Difference in melting point and resistivity based on the quality of material results in difference in predetermined area based on the quality of material.

In particular, in a unit battery the relationship between material of the tab and total cross-sectional area of the tab is preferably not less than 0.009 cm$^2$ for aluminum, not less than 0.005 cm$^2$ for copper, and not less than 0.004 cm$^2$ for nickel as explained in detail in later described examples. If such cross-sectional area has been secured, an incident that the tab 5 fuses and brings function of the battery to a halt even when a current of 100 A flows can be avoided regardless of the resistance value of the internal electrode body.

On the other hand, when the current value is huge, a voltage drop depending on the battery's internal resistance (hereafter referred to "internal resistance") becomes greater, but in such a case the voltage of closed circuit might go down under 3 V, which may frequently cause a problem in practical use. Therefore, it is necessary to suppress the internal resistance to not more than 10 mΩ, and for that purpose it is preferable to limit the resistance value of entire tabs 5 to not more than 1 mΩ per a unit battery. From such point of view, it is preferable to make total cross-sectional area of the tabs 5 not less than 0.014 cm$^2$ for aluminum, not less than 0.008 cm$^2$ for copper, and not less than 0.008 cm$^2$ for nickel.

Figure 2:
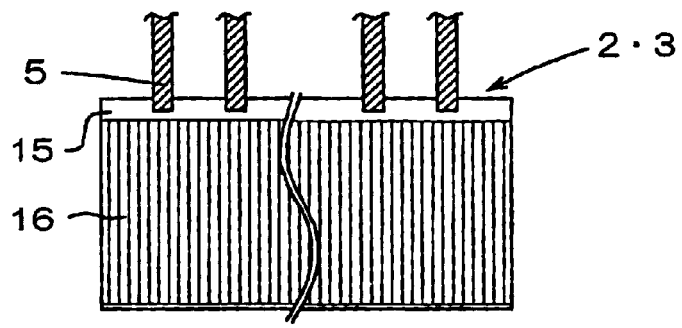
FIG. 2 is a plane view showing the spread state of each positive electrode and negative electrode in for a wound-type internal electrode body.

In addition, it is preferable that thickness of a tab 5 is not more than twice the thickness of an electrode active material layer 16 in the electrodes 2, 3 to which the tab 5 is welded and further preferably is not more than the thickness of the electrode active material layer 16. Here, with reference to FIG. 2 the thickness of the electrode active material layer 16 refers to the thickness of the electrode active material layer 16 of a unit layer formed on either side of the metal foil 15, that is one-side coating thickness.

FIGS. 5(a) and 5(b) are enlarged cross-sectional views showing one embodiment of the attachment part of the tabs 5 into the electrodes 2, 3 at the positive side in FIG. 4. But, it goes without saying that the similar idea can also be applied to arrangements for the negative side. As shown in FIG. 5(a), if thickness of the tab 5 is not more than twice the thickness of an electrode active material layer 16 in the positive electrode 2 to which the tab 5 is attached, the metal foil 15 as well as the separator 4 are bent in use of the space provided in the end part where any electrode active material layer 16 has not formed, thus the risk that the tabs 5 contacts the positive electrode plate 2 gets smaller. In addition, since such status where the part to which the tab 5 is attached swells toward the periphery and the external diameter of the internal electrode body 1 partially expands can be avoided, inconvenience hardly occurs for housing of the internal electrode body into the battery case 11. Moreover, as shown in FIG. 5(b), when thickness of a tab 5 is not more than the thickness of the electrode active material layer 16, neither short circuit to the above described opposite pole nor swelling at the attachment part of the tabs 5 will occur and thus will be more preferable Incidentally, if the total cross-sectional area of the tabs 5 gets greater with the length of tabs 5 being constant, the percentage of weight of tabs 5 occupying the battery increases, which becomes, thus, disadvantageous from the view point of energy density. Accordingly, it is preferable that the cross-sectional area of the tabs 5 is determined within the range where the tabs do not fuse for the above described predetermined current values, and moreover by considering thickness as well as weight of the tabs 5.

Now, in a battery shown in FIG. 4, safety valves using V-shape grooves 19 are only provided in each of positive and negative terminal plates 12, 14 as safety mechanism against excess current such as short circuit current, etc., but, otherwise, it goes without saying that safety mechanisms may be concurrently provided, that is, a PTC element may be provided, or a pressure joint may be provided between the rivet 13 and the external terminal 18. However, the time when these safety mechanisms operate only comes after a huge current has already flown. Under the circumstances, it may be thought that current fuse is disposed in a circuit outside a battery as a mechanism to cut off a current instantly at approximately the same time of occurrence of a huge current.

However, the SBA guidelines regulate that a lithium secondary battery should be free of burst or ignition to be evidenced by an external short circuit test. Under the circumstances, improvement in safety seems to be able to be planned if a current fuse may be incorporated in a battery, that is, the tabs 5 which are connected to the internal electrode body may be used also as a current fuse when abnormality in the internal electrode body being the source of current has occurred.

Based on such theory, in the present invention, at least a plurality of tabs 5 for current collecting to be connected to the electrodes 2, 3 are made to function as current fuses, but in this case, the internal resistance much affects a current value due to which the current fuse works. That is, even if an internal short circuit or an external short circuit takes place, when the internal resistance is huge, a short circuit current does not get larger while much larger excess current flows when the internal resistance is small. Therefore, the fusing current value of a current fuse is preferably set in accordance with the internal resistance. Here, although shapes of tabs 5 may be similar, difference in material results in showing different melting point and resistance value, thus, this current cutoff value is preferably set in accordance with the material of the tabs 5, and may be determinable by total cross-sectional area of tabs 5.

That is, as concerns a current fuse, in the present invention, the relationship between material of the tabs 5 and total cross-sectional area of the tabs when internal resistance of a unit battery is set R (mΩ) is preferably not more than 0.36/R (cm$^2$) for aluminum, not more than 0.18/R (cm$^2$) for copper, and not more than 0.14/R (cm$^2$) for nickel as explained in detail in the later described examples. In addition, for the purpose of making tabs 5 functional as current fuses even if the external short circuit resistance is around one times the internal resistance, it is preferable to set not more than 0.18/R (cm$^2$) for aluminum, not more than 0.09/R (cm$^2$) for copper, and not more than 0.07/R (cm$^2$) for nickel. By setting the resistance value of tabs 5 within such a range, a current may be cut off without making a safety valve operate, namely without driving out vaporized gas of such as an electrolyte, etc. from inside a battery.

Incidentally, as shown in FIG. 6, narrow parts 21 may be preferably provided in the tabs 5, making it easier for the tabs 5 to function as current fuses. In this case, total cross-sectional area of tabs 5 refers to total cross-sectional area of parts where the cross-sectional area of the narrow parts 21 becomes the smallest.

Also in such a battery where the tabs 5 are provided with function as a current fuse, the internal resistance is preferably not more than 10 mΩ per a unit battery. This is due to a request from a practical point of view that a voltage drop at the time of normal use should be preferably made as small as possible and the output loss should be preferably made as small as possible.

For the purpose of obtaining a battery having the two kinds of battery characteristics according to the above described present invention, namely tabs 5 never fusing because of a huge current under normal working conditions of a battery, and on the other hand the tabs 5 having a function to fuse as current fuses when an excess current such as a short circuit current, etc. has flown, it will do if the relationship between material of the tabs 5 and total cross-sectional area is set at not less than 0.008 $cm^2$ and not more than 0.36/1R $cm^2$ for aluminum, not less than 0.005 $cm^2$ and not more than 0.18/R $cm^2$ for copper, and not less than 0.004 $cm^2$ and not more than 0.14/R $cm^2$ for nickel, and further preferably at not less than 0.014 $cm^2$ and not more than 0.36/R $cm^2$ for aluminum, not less than 0.008 $cm^2$ and not more than 0.18/R $cm^2$ for copper, and not less than 0.008 $cm^2$ and not more than 0.14/R $cm^2$ for nickel.

Incidentally, without taking the present invention in particular, in a unit battery, when each tab 5 differs in terms of resistance value, there will occur difference in the value of current flowing through each tab 5, and a huge current will first flow in a tab 5 with small resistance value, resulting in fusing of the tab 5, thus, the current paths reduce to concentrate currents into the remaining tabs 5, and finally fusing of tabs 5 will occur in a chained fashion. For the purpose of avoiding such chain-fusing of tabs 5, it is preferable that variation of respective resistance values of the tabs 5 is arranged to remain within ±20% of an average value.

For example, it goes without saying that lack of variance in shape of respective tabs 5 is preferred so that such deviation of resistance values of tabs 5 is made smaller, and moreover, when an end part opposite to the end connected with electrodes of the tabs 5 is connected by pressure attachment or welding or eyelet, deviation of resistance of the tabs 5 in a unit battery can be reduced and preferable. In such a connection method, it is thought that an alumina film formed on a surface of a tab made of aluminum (hereinafter referred to "Al tab"), and a copper oxide film formed on a tab made of copper (hereinafter referred to "Cu tab") will respectively be destroyed to reduce contact resistance between tabs 5, and connection by metal parts genuinely of tabs 5 may become feasible, thus deviation in resistance value may be controlled.

The characteristics of the above described lithium secondary battery of the present invention are preferably adopted as a lithium secondary battery with battery capacity of not less than 5 Ah, and the lithium secondary battery is preferably used for an electric vehicle (EV) or for a hybrid electric vehicle (HEV).

So far, a case involving a wound-type internal electrode body 1 has been explained as an example of an embodiment of the present invention, however, it is obvious that the above described conditions are applicable to the case involving a lamination type internal electrode body 7 as well.

Next, the present invention is explained in further detail by way of examples, but it goes without saying that the present invention is not limited to the above described embodiments as well as following examples.

EXAMPLE

Measurement of Resistance Value as Well as Current-proof Value of a Tab

For the purpose of checking out material of a tab, cross-sectional area thereof, and a current value with which the tab does not fuse, whether fusing occurs or not has been checked out, involving tabs respectively made of various kinds of materials whose width is 10 mm, length is 50 mm and thicknesses are different from other, with both ends being grasped and a predetermined current being made to flow by way of a constant-current power supply for two minutes. Test conditions as well as results are indicated in Table 1.

TABLE 1

| Test sample number | Quality of material | Thickness (μm) | Current value (A) | Occurrence of fusing of a tab |
|---|---|---|---|---|
| 1 | Aluminum | 20 | 25 | No |
| 2 |  | 20 | 30 | Yes |
| 3 |  | 50 | 50 | No |
| 4 |  | 50 | 60 | No |
| 5 |  | 50 | 70 | Yes |
| 6 | Copper | 10 | 25 | No |
| 7 |  | 10 | 30 | Yes |
| 8 |  | 20 | 40 | No |
| 9 |  | 20 | 50 | Yes |
| 10 |  | 30 | 50 | No |
| 11 |  | 30 | 60 | No |
| 12 |  | 30 | 70 | Yes |

It is understood that as a result shown in Table 1, in the case where tabs are made of aluminum, four sheets each with 20 μm thickness (total cross-sectional area: 0.008 $cm^2$) and approximately 1.7 sheets each with 50 μm thickness (total cross-sectional area: 0.0085 $cm^2$) are to be required so that the tabs do not fuse at 100 A. Accordingly, in the case of an Al tab, if it has total cross-sectional area of not less than 0.009 $cm^2$, it shall not fuse at a 100 A current.

Likewise, it is understood that in the case where tabs are made of copper, four sheets each with 10 μm thickness (total cross-sectional area: 0.004 $cm^2$) and approximately 1.7 sheets each with 30 μm thickness (total cross-sectional area: 0.005 $cm^2$) is to be required. Accordingly, in case of a Cu tab, if it has total cross-sectional area of not less than 0.005 $cm^2$, it shall not fuse at a 100 A current. Incidentally, also for tabs made of nickel (hereinafter referred to "Ni tab") experiments similar to those described above have been conducted to find out that total cross-sectional area free from fusing at 100 A current was not less than 0.004 $cm^2$.

On the other hand, resistance values of one sheet of tab have been measured, average values of which have been 7mΩ for an Al tab (cross-sectional area: 0.002 $cm^2$) with thickness of 20 μm, 8 mΩ for a Cu tab (cross-sectional area: 0.001 $cm^2$) with thickness of 10 μm, and 8 mΩ for an Ni tab (cross-sectional area: 0.001 $cm^2$) with thickness of 10 μm. Therefore, from the view point of reduction in the internal resistance, for the purpose of controlling resistance values of the tabs to not more than 1 mΩ, seven sheets of Al tab with thickness of 20 μm, that is, not less than 0.014 cm² in terms of total cross-sectional area, and eight sheets of Cu tab or Ni tab with thickness of 10 μm, that is, not less than 0.008 cm² in terms of total cross-sectional area will do. In the case where tabs with a variety of thickness are used without changing materials, it will work well if a certain number of tabs to be used are set in accordance with thickness so that such predetermined total cross-sectional areas may be provided.

Incidentally, in batteries for EV or HEV, it is assumed a current with a value close to 200 A should flow, but it is to be understood that approximately 200 A current may be tolerable with such a total cross-sectional area that provides with tab's resistance not more than 1 mΩ since the total cross-sectional area is approximately twice the total cross-sectional area which does not fuse at the formerly-described 100 A.

Forming of a Battery and Current-carrying Test

Next, a battery related to examples and comparative examples which have configuration shown in FIG. 4 have been formed as per the following method. At first, a paste has been formed with $LiMn_2O_4$ powder body as a positive active material, to which acetylene black has been added to give conductivity to this, and further a binder and a solvent are mixed therewith. With this paste being coated on both sides of an aluminum foil with thickness of 25 μm, a positive electrode 2 has been formed having an electrode plane shape of the length towards winding direction 3600 mm×the width 200 mm. On the other hand, a paste has been formed with a highly graphitized carbon powder as a negative active material, with which a binder and a solvent are mixed, and the paste has been coated on both sides of a copper foil with thickness of 20 μm, and thereby a negative electrode 3 has been formed having a electrode plane shape of the length towards winding direction 4000 mm×the width 200 mm.

Next, the thus-formed positive electrode 2 and negative electrode 3 were wound with insulation by 220 mm-wide separators 4 made of polypropylene and at the same time the number of sheets indicated in Table 2 of each of an Al tab with 10 mm width, 50 mm length, and 20 μm thickness and a Cu tab with 10 mm width, 50 mm length, and 10 μm thickness were attached respectively to the electrodes 2, 3 by ultrasonic-welding so that they were arranged to make an approximate straight line along the direction of the diameter of the internal electrode body 1, and so that each of electrodes 2, 3 was placed at even distances when they were spread out, and further so that one of the electrodes was formed at one end of the internal electrode body 1.

TABLE 2

| | Number of Al tabs | Number of Cu tabs | Method of connection with a current extracting terminal | Result of 100 A current flow | Result of 200 A current flow |
|---|---|---|---|---|---|
| Example | 10 | 10 | Pressure attachment by rivet | Fusing did not occur | Fusing did not occur |
| Comparative example 1 | 2 | 2 | Pressure attachment by rivet | Fusing occurred | Test not feasible |
| Comparative example 2 | 10 | 10 | Tightening by screw | Fusing did not occur | Fusing occurred |

Figure 7:
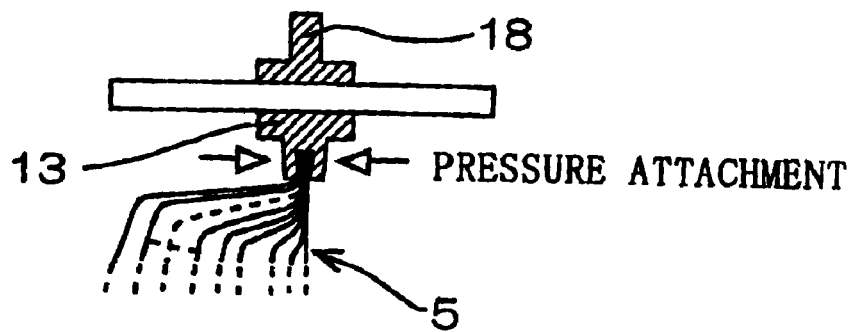
FIG. 7 is an explanatory drawing showing a method of pressure attachment of tabs to a rivet.

Next, as for batteries related to Example and Comparative example 1, the thus-formed internal electrode body 1 was fitted in to the aluminum-made battery case 11, arranging tabs 5 respectively to each positive electrode and negative electrode as shown in FIG. 7 and pressure-attaching the tabs to rivets 13 respectively being the current extracting terminals under pressure of 1 ton/cm², attaching a copper-made negative terminal plate 14 onto the negative rivet 13 and an aluminum-made positive terminal plate 12 onto the positive rivet 13 respectively. And then the negative side of the battery case 11 was sealed, and thereafter, from the open side of the positive terminal of the battery case 11, the electrolyte, a mixed solvent of EC and DEC where electrolyte $LiPF_6$ was dissolved to yield 1 mol % density, was injected into the case and thereafter, the positive side was sealed tightly.

Figure 8:
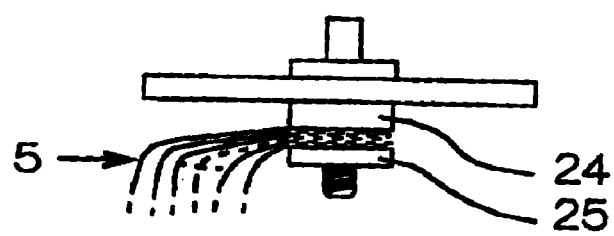
FIG. 8 is an explanatory drawing showing a method of tightening a screw for tabs.

On the other hand, as for batteries related to Comparative example 2, as shown in FIG. 8, using a current extracting terminal comprising a bolt 24 and a nut 25, tabs 5 were sandwiched between that bolt 24 and the nut 25 to be fixed. Other conditions were set to be the same as those for a battery related to Example. Initial capacity of any of thus-formed batteries related to Example and Comparative examples was 25 Ah.

Figure 9:
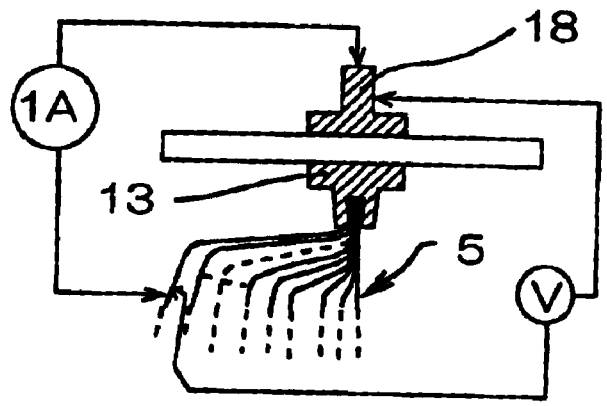
FIG. 9 is an explanatory drawing showing a method of measuring deviation of resistance of tabs.

Incidentally, on the occasion of forming batteries for Example and Comparative examples 1, 2, variation of resistance (resistance distribution) of tabs 5 to be caused by difference in the method of connection between tabs 5 and current extracting members was examined in advance by measuring voltage at the time when 1 A current flew an external terminal 18 conducting to each tab 5 as well as to a rivet 13 as shown in FIG. 9 for the case of Example as well as Comparative example 1. In addition, as for the case of Comparative example 2, between tabs 5 and the bolt 24, deviation of resistance of tabs 5 were measured by a similar method. The results revealed that in Example as well as in Comparative example 1, deviation of resistance of tabs 5 ranged within not wider than ±20% of an average value while in the case of Comparative example 2, a wider deviation which was not plotted within the range of not wider than ±20% of an average value was presented.

Successively, an operation test on a battery has been conducted by discharging currents of 100 A as well as 200 A into the formed battery. Results are also put down in Table 2. In the battery of Example, fusing of tabs 5 was not observed, but normal operation was conducted under a current value of any of 100 A and 200 A. However, in the battery of Comparative example 1, fusing of tabs 5 was observed, and normal operation of the battery was not conducted even at discharge of 100 A. On the other hand, in a battery of Comparative example 2, no problem occurred at discharge of 100 A, but the tabs fused at discharge of 200 A.

As concerns a battery for Comparative example 2, the tabs 5 have the same total cross-sectional area as that in Example, but there is a difference in method of connection between tabs 5 and a current extracting terminal. As for aluminum foils and copper foils, oxidated film is apt to be formed on their surfaces, and therefore, it is presumed that current concentration took place at a certain tab 5 to fuse as a result of deviation of resistance values of each tab 5 occurring due to differences in the connection state of tabs 5, affected by oxidated film because of lower pressure of pressure attachment in Comparative example 2 as compared with the case of Example, and moreover reduction of current paths due to that fusing resulted in occurrence of fusing of tabs 5 in a chain fashion. Consequently, it is understood that preferably deviation of respective resistance values of tabs 5 ranges within ±20% of the average value.

External Short Circuit Test

Next, batteries having the same configuration as the one in the above described Example with cross-sectional area of tabs 5 having been made sufficiently wider have been formed, and an external short circuit test has been conducted. At this time, the resistance value of the external short circuit (hereinafter referred to "external circuit resistance") has been made to change corresponding to internal resistance. Consequently, in the case where an external circuit resistance was set 1.5 times the internal resistance, the safety valve did not operate similar to the case of normal discharge after short circuit. In addition, in the case where external circuit resistance was set 1 times the internal resistance, the safety valve operated after short circuit but no burst nor ignition of batteries were observed. On the contrary, in the case where external circuit resistance was set 0.1 times the internal resistance, although the safety valve operated after short circuit, occurrence of cracks in portions other than the safety valve were confirmed.

In the external short circuit test, like this, behavior of a battery is different as per external circuit resistance, thus for the purpose of conducting combined use of a tab as a current fuse, it is preferable to design a value of current cutoff of a current fuse, especially assuming the external circuit resistance being not more than 0.1 times the internal resistance, taking this test result into consideration. For example, with a battery being under the fully charged state, in the case where the voltage is 4 V, the current capacity is 25 Ah, and the internal resistance is 5 m$\Omega$, a short circuit current of approximately 800 A is to flow, therefore, as per the results of the formerly mentioned tab's fusing test, it will do that as for Al tabs the total cross-sectional area may be made not more than 0.064 cm$^2$ being 8 times that in the case of current value of 100 A, and similarly, as for Cu tabs not more than 0.040 cm$^2$, and as for Ni tabs not more than 0.032 cm$^2$ so that the tabs fuse at the 800 A current.

Accordingly, next, a battery whose Al tabs have total cross-sectional area of 0.06 cm$^2$ and Cu tabs have total area of 0.035 cm$^2$ and a battery whose Al tabs have total cross-sectional area of 0.1 cm$^2$ and Cu tabs have total area of 0.05 cm$^2$ have been respectively formed, and an external short circuit test has been conducted, setting the external short circuit resistance to 0.1 times the internal resistance. As a result, for the one comprising Al tabs with total cross-sectional area of 0.06 cm$^2$, immediately after short circuit, Al tabs and Cu tabs fused and both the current and the voltage indicated 0, but the other one comprising Al tabs with total cross-sectional area of 0.1 cm$^2$, it was confirmed that the safety valve operated after short circuit and cracks had occurred at portions other than the safety valve.

Next, by way of a method similar to the above described method of forming a battery, with changing area, width, etc. of electrodes, various batteries being different in battery capacity and internal resistance have been formed, utilizing Al tabs, Cu tabs and Ni tabs, and an external short circuit test has been conducted. As a result, it has become obvious that if Al tabs are provided not more than 0.36/R (cm$^2$), R (m$\Omega$) being the internal resistance, they work as current fuse when the external short circuit provides 0.1 times the internal resistance, and thus fulfill the SBA guidelines. Similarly, it has become obvious that Cu tabs with not more than 0.18/R (cm$^2$) and Ni tabs with not more than 0.14/R (cm$^2$) will do.

Moreover, it is preferable that battery reaction will halt safely without the safety valve operating in the event of external short circuit with the external circuit resistance being 1 times the internal resistance. Accordingly, similar to the former external short circuit test, using a battery with current capacity being 25 Ah and internal resistance being 5 m$\Omega$, a battery comprising Al tabs having total cross-sectional area of 0.03 cm$^2$ smaller than 0.18/R and a battery comprising Al tabs having total cross-sectional area of 0.05 cm$^2$ larger than 0.18/R have been formed to conduct an external short circuit test. As a result, in the battery comprising Al tabs having total cross-sectional area of 0.03 cm$^2$, the safety valve did not operate, after short circuit, similar to the case of normal discharge, but in the battery comprising Al tabs having total cross-sectional area of 0.05 cm$^2$, the safety valve operated after short circuit. Nevertheless, even in this case, burst or ignition of the battery did not take place in portions other than the safety valve.

As a result of the above, it has been understood that with Al tabs having total cross-sectional area of not more than 0.18/R cm$^2$, the safety valve does not operate in the event of external short circuit with external circuit resistance such as one times the internal resistance, either, and such a tab is preferable. Likewise, it has become obvious that total cross-sectional area of not more than 0.09/R cm$^2$ for Cu tabs, and of not more than 0.07/R cm$^2$ for Ni tabs will do.

As described above, according to a lithium secondary battery of the present invention, an excellent effect that without tab's fusing within a working current range since total cross-sectional area of tabs is set within an appropriate range, reduction in output loss as well as improvement in energy density may further be planned is yielded, and on the other hand, an excellent effect that security of safety as well as improvement in safety may be planned is attained by incorporating tabs as current fuses into a battery. In addition, a remarkable effect that a battery superior in reliability is provided by having these characteristics simultaneously in combined fashion can be achieved.

What is claimed is:

1. A lithium secondary battery, comprising:
    an internal electrode body including a positive electrode, a negative electrode, and a separator, the positive electrode and the negative electrode being wound with the separator so that the positive electrode and the negative electrode are prevented by the separator from coming into direct contact with each other;
    an organic electrolyte; and
    at least a plurality of positive electrode tabs connected to the positive electrode and at least a plurality of negative electrode tabs connected to the negative electrode for current collecting, a thickness of a said tab being not more than twice a thickness of an electrode active material layer in an electrode to which the tabs are welded,
    a total cross-sectional area of all of the positive electrode tabs connected to the positive electrode being not less than a constant area in accordance with the quality of the material to be used for the tabs, said tabs connected to the positive electrode being aluminum tabs wherein a total cross-sectional area of all of said tabs connected to the positive electrode is not less than 0.009 cm$^2$ and not more than 0,36/R cm$^2$, R being internal resistance, in m$\Omega$, of a unit battery;
    a total cross-sectional area of all of the negative electrode tabs connected to the negative electrode being not less than a constant area in accordance with the quality of the material to be used for the tabs, said tabs connected to the negative electrode being selected from among copper tabs wherein a total cross-sectional area of all of said tabs connected to the negative electrode is not less than 0.005 cm$^2$ and not more than 0.18/R cm$^2$, and nickel tabs wherein a total cross-sectional area of all of said tabs connected to the negative electrode is not less than 0.004 cm$^2$ and not more than 0.14/R cm$^2$, and wherein said tabs function as current fuses to become nonconductive in the event that a condition arises during discharge of the battery in which sufficient current to damage one or more components of the battery is provided.

2. The lithium secondary battery according to claims 1, wherein a sum of resistance value of the tabs per a unit battery is not more than 1 mΩ.

3. The lithium secondary battery according to claim 1, wherein the tabs are provided with a narrow portion.

4. The lithium secondary battery according to claim 1, wherein internal resistance is not more than 10 mΩ per a unit battery.

5. The lithium secondary battery according to claim 1, wherein deviation of respective resistance values of the tabs remains within ±20% of an average value.

6. The lithium secondary battery according to claim 1, wherein said battery further comprises a positive terminal and a negative terminal, and each said tab is:

connected at a first end to the positive electrode or the negative electrode, and at a second end to said positive terminal or said negative terminal by pressure attachment;

connected at a first end to the positive electrode or the negative electrode, and at a second end to said positive terminal or said negative terminal by welding; or connected at a first end to the positive electrode or the negative electrode, and comprises at a second end an eyelet which is connected to said positive terminal or said negative terminal.

7. The lithium secondary battery according to claim 1, wherein battery capacity is not less than 5 Ah.

8. The tithium secondary battery according to claim 1, wherein the battery is used for an electric vehicle or a hybrid electric vehicle.

9. The lithium secondary battery according to claim 1, wherein said tabs connected to the positive electrode are aluminum tabs wherein a total cross-sectional area of all of said tabs connected to the positive electrode is not less than 0.014 cm$^2$, and wherein said tabs connected to the negative electrode are selected from among copper tabs wherein a total cross-sectional area of all of said tabs connected to the negative electrode is not less than 0.008 cm$^2$, and nickel tabs wherein a total cross-sectional area of all of said tabs connected to the negative electrode is not less than 0.008 cm$^2$.

10. The lithium secondary battery according to claim 1, wherein a thickness of a tab is not more than a thickness of an electrode active material layer in an electrode to which the tabs are welded.

11. The lithium secondary battery according to claim 1, wherein said tabs connected to the positive electrode are aluminum tabs wherein a total cross-sectional area of all of said tabs connected to the positive electrode is not more than 0.18/R (cm$^2$), and wherein said tabs connected to the negative electrode are selected from among copper tabs wherein a total cross-sectional area of all of said tabs connected to the negative electrode is not more than 0.09/R cm$^2$, and nickel tabs wherein a total cross-sectional area of all of said tabs connected to the negative electrode is not more than 0.07/R cm$^2$.

12. The lithium secondary battery according to claim 1, wherein said tabs connected to the positive electrode are aluminum tabs wherein a total cross-sectional area of all of said tabs connected to the positive electrode is not less than 0.014 cm$^2$ and not more than 0.18/R (cm$^2$), and wherein said tabs connected to the negative electrode are selected from among copper tabs wherein a total cross-sectional area of all of said tabs connected to the negative electrode is not less than 0.008 cm$^2$ and not more than 0.09/R cm$^2$, and nickel tabs wherein a total cross-sectional area of all of said tabs connected to the negative electrode is not less than 0.008 cm$^2$ and not more than 0.07/R cm$^2$.

* * * * *

UNITED STATES PATENT AND TRADEMARK OFFICE
CERTIFICATE OF CORRECTION

PATENT NO. : 6,753,104 B2
DATED : June 22, 2004
INVENTOR(S) : Kenshin Kitoh

It is certified that error appears in the above-identified patent and that said Letters Patent is hereby corrected as shown below:

Column 1,
Line 16, insert -- the -- after "of"

Column 5,
Line 11, delete "in"

Column 8,
Line 5, insert -- . -- after "preferable"

Column 14,
Line 54, change "0,36/R" to -- 0.36/R --

Column 15,
Line 33, change "tithium" to -- lithium --

Signed and Sealed this

Sixteenth Day of November, 2004

JON W. DUDAS
*Director of the United States Patent and Trademark Office*